(12) United States Patent
Illiano

(10) Patent No.: US 10,637,352 B2
(45) Date of Patent: Apr. 28, 2020

(54) HIGH POWER CHARGE PUMP WITH INDUCTIVE ELEMENTS

(71) Applicant: Brusa Elektronik AG, Sennwald (CH)

(72) Inventor: Enzo Illiano, Lugano (CH)

(73) Assignee: Brusa Elektronik AG, Sennwald (CH)

( * ) Notice: Subject to any disclaimer, the term of this patent is extended or adjusted under 35 U.S.C. 154(b) by 0 days.

(21) Appl. No.: 16/331,054

(22) PCT Filed: Aug. 30, 2017

(86) PCT No.: PCT/EP2017/071770
§ 371 (c)(1),
(2) Date: Mar. 6, 2019

(87) PCT Pub. No.: WO2018/046370
PCT Pub. Date: Mar. 15, 2018

(65) Prior Publication Data
US 2019/0229616 A1    Jul. 25, 2019

(30) Foreign Application Priority Data

Sep. 7, 2016   (DE) .................. 10 2016 217 040

(51) Int. Cl.
*H02M 1/10*    (2006.01)
*H02M 3/07*    (2006.01)
(Continued)

(52) U.S. Cl.
CPC .......... *H02M 3/073* (2013.01); *H02M 1/083* (2013.01); *H02M 3/158* (2013.01); *H02M 3/07* (2013.01);
(Continued)

(58) Field of Classification Search
None
See application file for complete search history.

(56) References Cited

U.S. PATENT DOCUMENTS 6,429,632 B1    8/2002  Forbes et al.
9,235,228 B2 *  1/2016  Gazit ................... H02M 3/158
(Continued)

FOREIGN PATENT DOCUMENTS

| DE | 102012216691 A1 | 3/2014 |
| FR | 2860660 A1 | 4/2005 |
| WO | WO 2008/047374 A2 | 4/2008 |

OTHER PUBLICATIONS

International Search Report and Written Opinion issued in International Application No. PCT/EP2017/071770 dated Nov. 27, 2017.
(Continued)

*Primary Examiner* — Lincoln D Donovan
*Assistant Examiner* — Khareem E Almo
(74) *Attorney, Agent, or Firm* — Hoffmann & Baron, LLP

(57) ABSTRACT

A high power unidirectional or bidirectional charge pump with inductive elements for high power DC-DC converter applications. Inductive elements resonating with storage capacitors allow zero current switching processes. Storage elements in the form of capacitors instead of conventional inductors allow a cheap and lightweight construction. The output voltage cannot be actively regulated and corresponds to a fraction of the input voltage. However, several voltage ratios can be easily obtained between output and input, such as 0.25, 0.33, 0.5, 0.75, 1.25, 1.33, 1.5, 2, 3, and 4.

15 Claims, 8 Drawing Sheets

(51) Int. Cl.
  *H02M 3/158* (2006.01)
  *H02M 1/08* (2006.01)
  *H02M 1/00* (2006.01)
  *H02M 3/335* (2006.01)

(52) U.S. Cl.
  CPC .... *H02M 3/335* (2013.01); *H02M 2001/0058* (2013.01); *H02M 2001/0093* (2013.01); *Y02B 70/1491* (2013.01)

(56) References Cited

U.S. PATENT DOCUMENTS

| | | |
|---|---|---|
| 2004/0141345 A1 | 7/2004 | Cheng et al. |
| 2007/0014135 A1 | 1/2007 | Taurand |
| 2009/0261793 A1 | 10/2009 | Urakabe et al. |
| 2010/0019753 A1 | 1/2010 | Ikeda et al. |
| 2012/0051095 A1 | 3/2012 | Steigerwald et al. |
| 2012/0081933 A1* | 4/2012 | Garrity ............... H02M 7/4807 363/37 |
| 2014/0327420 A1 | 11/2014 | Lee et al. |
| 2016/0020693 A1 | 1/2016 | Ribarich |
| 2017/0288406 A1* | 10/2017 | Chisenga ................ H02J 3/383 |
| 2018/0269782 A1* | 9/2018 | Mondal ................ H02M 3/155 |
| 2019/0097543 A1* | 3/2019 | Achtzehn ............ H02M 3/1582 |
| 2019/0157986 A1* | 5/2019 | Ginart .................. H02M 3/158 |
| 2019/0229616 A1* | 7/2019 | Illiano .................. H02M 1/083 |

OTHER PUBLICATIONS

International Preliminary Report on Patentability issued in International Application No. PCT/EP2017/071770 dated Mar. 21, 2019.

* cited by examiner

HIGH POWER CHARGE PUMP WITH INDUCTIVE ELEMENTS

CROSS-REFERENCE TO RELATED APPLICATIONS

The present application is the U.S. National Phase of PCT/EP2017/071770, filed on Aug. 30, 2017, which claims priority to German Patent Application No. 10 2016 217 040.6, filed on Sep. 7, 2016, the entire contents of which are incorporated herein by reference.

BACKGROUND

Field

The invention relates to DC-DC converters. More specifically, the invention is directed to a charge pump for high power applications, in particular, including inductive elements combined with capacitors which allow zero current switching processes and consequently a minimization of the losses.

Related Art

Efficient and lightweight DC to DC voltage conversion is required in a widespread range of applications which involve the most disparate power levels from small supplies with output powers in the mW order to large MW plants.

To obtain an efficient DC to DC conversion there are several possible topologies. However, the basic principle behind DC-DC conversion is always the same. Any topology presents an input DC link, an output DC link, and one (or more) storage element. In a first step, some energy is transferred from the input DC Link to the storage element. In a second step, energy is transferred from the storage element to the output DC link. The sequence is then repeated.

The quasi-totality of high power converters employs inductive elements as storage elements. In very low power applications it is also common to employ capacitors as storage elements, often with circuits known as charge pumps.

For high power applications, charge pumps (e.g., capacitors as storage elements) are practically never used.

Charge pumps allow extremely poor control possibilities concerning the current flow and/or the output voltage. However, the utilization of capacitors as storage elements involves significant benefits in terms of costs, weight, and manufacturing process.

A specific type of DC to DC power converter and a method of conversion is disclosed in U.S. Pat. No. 6,429,632 B1, provided using high-frequency switched capacitors where the switches are implemented by CMOS transistors or diodes on an integrated-circuit chip and using inductors to limit charging current. High efficiency is achieved using inductors to reduce energy losses in circuit capacitors by high frequency switching when inductor current is zero and capacitor voltage is maximized. The high-frequency (100 MHz or greater) operation of the converter circuit permits the use of inductors with a low inductance value on the order of 100 nH (100×10−9 Henrys) capable of fabrication directly on an integrated-circuit (IC) chip. The use of CMOS integrated components allows the entire converter to be formed on a single IC chip, saving significant space within the portable system. Output voltage and current is high enough to permit EEPROM programming. In addition, fluctuations in the output voltage (ripple voltage) are substantially eliminated when several of the converter circuits are used in parallel. While this type of converter is adapted for the use inside integrated circuits and operating with high currents, it is not suitable for high voltages and high power applications as for instance in hybrid or electric vehicles.

SUMMARY OF THE INVENTION

The object of the present invention is a charge pump topology suited for high power applications which does not require an accurate output voltage control.

This object is achieved by the features of independent claim 1. Further embodiments and advantageous variants of the inventive concept are given in the dependent claims, the following specification, and the accompanying drawings.

Compared to classical and widespread charge pump topologies (designed for low power applications) the design proposed herein includes inductive elements which allow a zero current switch and a resonant operation of the converter, with the special resonant waveform generated with only one coil and one capacitor. In addition, the necessary winding goods can be reduced considerably, thereby making the new converter design more cost-effective and more lightweight.

The working frequency is typically below 500 kHz, preferably spans the range from about 20 kHz to about 200 kHz. The rated input voltage is typically in the range of about 400 V and can be boosted up to 800 V, allowing for instance to charge 800 V batteries at 400 V stations or allowing the supply of 400 V systems by such 800 V batteries. Typical power values are between 20 kW up to 200 kW, but can even be lower or higher.

BRIEF DESCRIPTION OF THE DRAWINGS

The list of reference numerals is part of the disclosure. The drawing figures are described in correlation and jointly. The same reference numerals are used for the same parts. Reference numerals with different indices are used for functionally identical or similar parts.

FIG. 4 shows a charge pump circuit with pre-charge elements, which allow a significant reduction of inrush currents when the device is turned on.

DETAILED DESCRIPTION

Figure 1A:
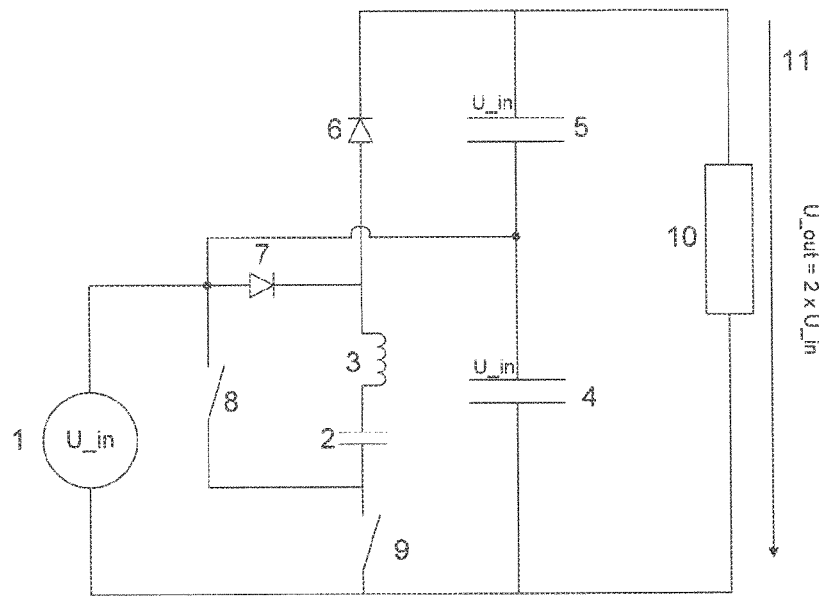
FIG. 1A shows a charge pump circuit which doubles the input voltage.
Figure 1B:
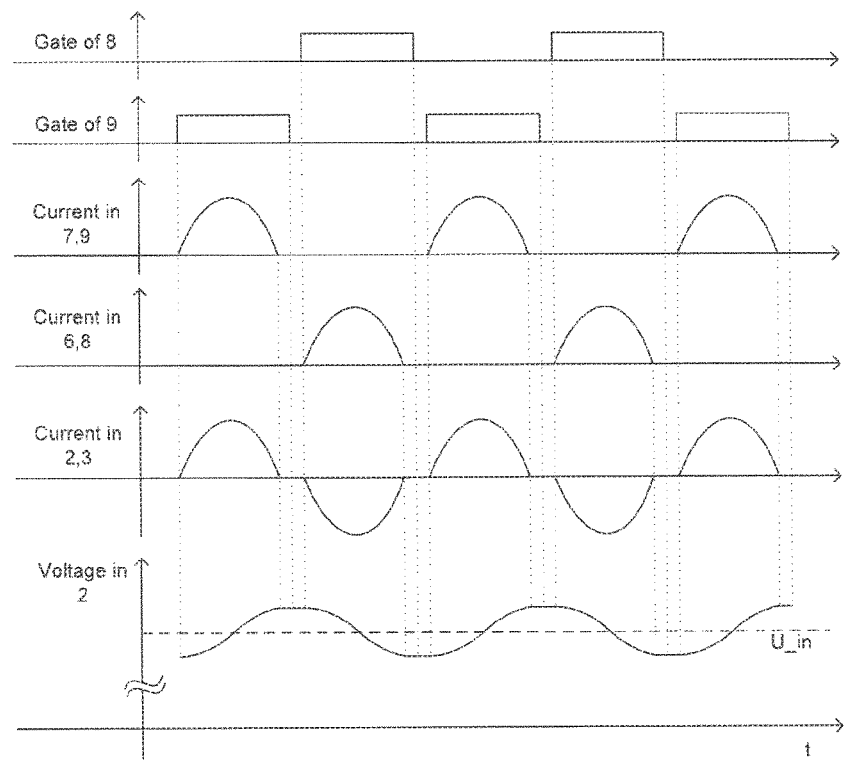
FIG. 1B shows corresponding qualitative waveforms in the main components of FIG. 1A.

FIG. 1A shows a charge pump circuit which doubles the input voltage, and FIG. 1B shows corresponding qualitative waveforms in the main components of FIG. 1A. By turning on the charging switch 9, the storage capacitor 2 is charged through the inductive element 3. In steady state condition, the process starts when the voltage on the capacitor 2 is slightly slower compared to the input DC-link voltage 1. Due to an initial voltage difference between the input DC-link 1 and the storage capacitor 2, an oscillation process with the inductive element 3 takes place. A sinusoidal current flows through the charging switch 9 and the charging diode 7. After half of the oscillation period, the diode 7 avoids a current flow in the opposite direction and the oscillation is consequently stopped. The voltage on the storage capacitor 2 remains therefore slightly higher than the voltage of the input DC-link 1. At that moment, after a short "dead time," the discharging switch 8 is turned on. Due to a voltage difference between the storage capacitor 2 and the upper DC-Link capacitor 5, which is constantly charged at the voltage U_in, an oscillation between the storage capacitor 2 and the inductive element 3 takes place. The current flow succeeds through the discharging switch 8 and the discharging diode 6. After half of the oscillation period, the diode 6 avoids a current flow in the opposite direction and the oscillation is therefore stopped.

Again, after a short "dead time" the charging switch 9 is turned on and the whole process is repeated. Each of the described switching processes can be considered as zero current transitions, and therefore the switching losses of the described system are very low. The switches are all activated and deactivated, respectively, for about 50% of the duty cycle.

For a correct operation, it is important that the resonance frequency between the components 3 and 2 is equal to or larger than the switching frequency. Nevertheless, to minimize the dead time, and thus reduce the peak current in the components, the switching frequency should possibly equal the resonance frequency.

In addition, to avoid oscillations on the output voltage, the DC-link capacitors 4 and 5 must be significantly larger than the storage capacitor 2.

The whole process described above can be summarized as follows: In a first step, energy is transferred from the bottom DC link capacitor 4 (which is connected to the input DC-Link) to the storage capacitor 2. In a second step, energy is transmitted to the top DC-link capacitor 5.

Figure 2A:
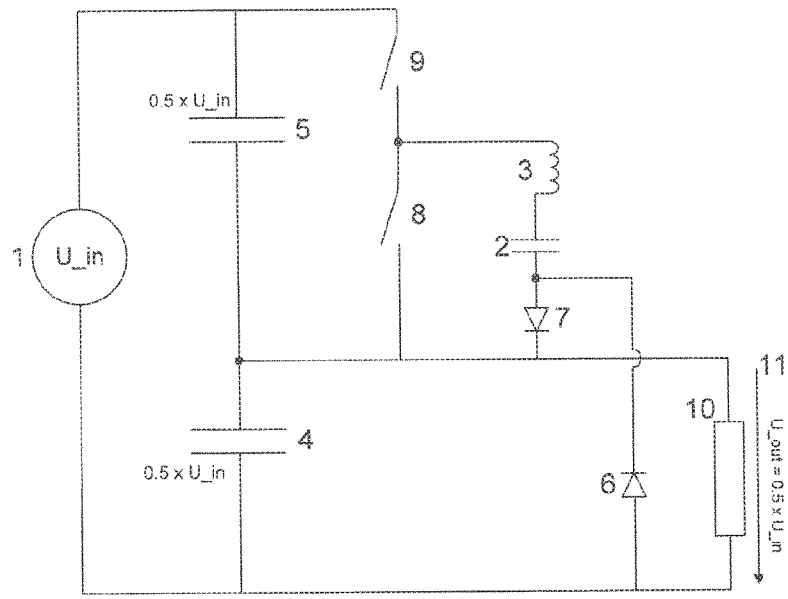
FIG. 2A shows a charge pump circuit which halves the input voltage.
Figure 2B:
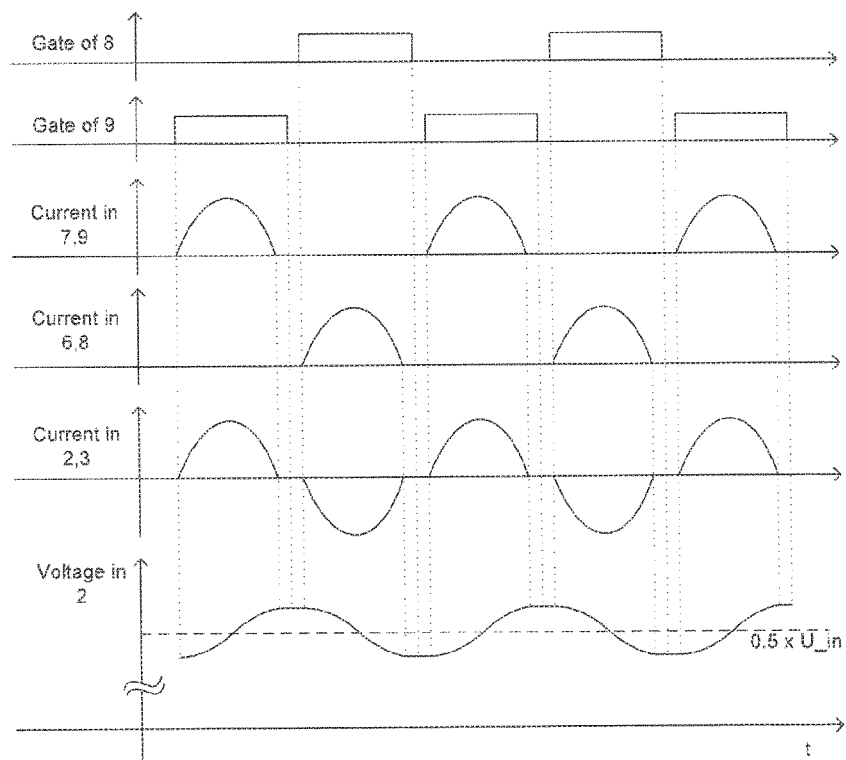
FIG. 2B shows corresponding qualitative waveforms in the main components of FIG. 2B.

An embodiment which allows to halve the input voltage is shown in FIG. 2A, and corresponding qualitative waveforms in the main components are shown in FIG. 2B. The basic principle is very similar to the one described above. The turning on of the charging switch 9 triggers a half-period oscillation, which transfers energy from the top DC-Link capacitor to the storage capacitor. The activation of the discharge switch 8 triggers a half-period oscillation, which transfers energy to the bottom DC-link capacitor.

Figure 3:
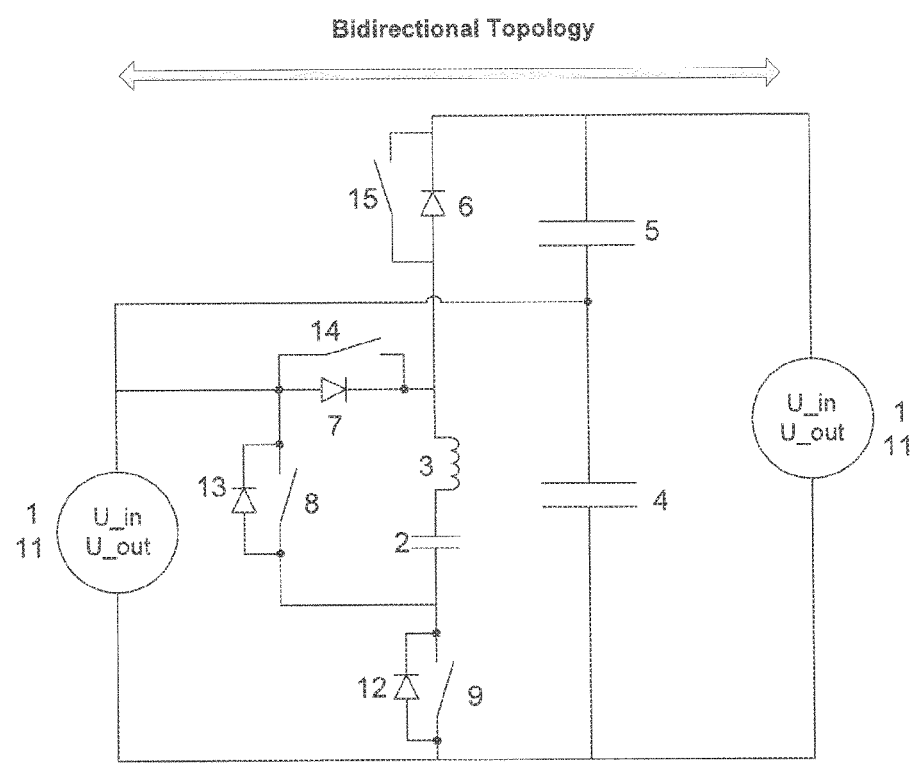
FIG. 3 shows an embodiment of a charge pump circuit, which allows a bidirectional energy flow.

The combination of the two principles described above results in a bidirectional embodiment which is shown in FIG. 3. If the left side is used as input DC-Link, the charge pump works as a voltage doubler. In this case, the active semiconductor components are 8, 9, 7, and 6. Instead, if the right side of the figure is used as input DC link, the charge pump works as a voltage divider. In this case, the active components are 12, 13, 14, and 15. The diode-switch combinations 12-9, 13-8, 14-7, and 15-6 must not necessarily be separate components. Especially if MOSFETs are used, it is convenient to employ the body diodes of the semiconductor. The utilization of body diodes has an additional advantage for bidirectional embodiments.

With a bidirectional configuration it is also possible to implement the so-called active rectification, e.g., activate the switch parallel to the conducting diode to reduce losses. However, it is very important that the switch is turned off before the end of the half period oscillation. If the switch is not deactivated, the diode cannot stop the oscillation after a half of the period and the operation of the circuit is significantly degraded.

Figure 4:
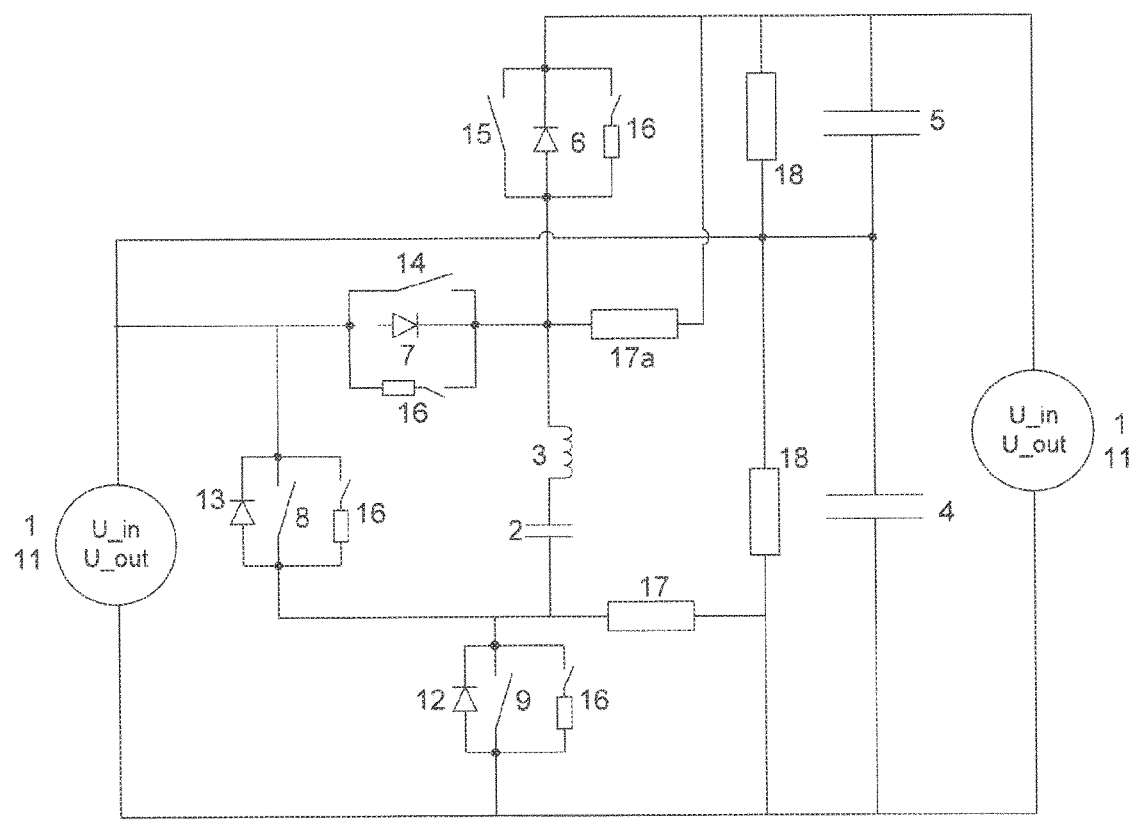

FIG. 4 proposes a solution to avoid high inrush currents while the charge pump is turned on. First of all, it is important to guarantee that the two DC link capacitors 4 and 5 are charged at the same voltage. This can be guaranteed with two identical large resistors 18. Before any switching event, it is also crucial to guarantee a pre-charge in the storage capacitor. This can be guaranteed with a resistor in positions 17 and/or 17a. If a pre-charge resistor is placed in position 17, the capacitor is charged through the diode 7 by the bottom DC-Link capacitance 4. If a pre-charge resistor is placed in position 17a, the capacitor is charged through the diode 13 by the top DC-Link capacitor 5.

Alternatively to charging resistors, it is also possible to place highly resistive switches 16 parallel to one or more of the main switches. In this way, during the first switching events only the highly resistive paths are activated, thus avoiding high currents to charge the capacitors 2, 4, and 5. Once the capacitors are charged, the system can operate normally and the main switches 8, 9, 14, and 15 can be activated.

Another option to avoid inrush currents is to operate one or more of the main switches 8, 9, 14, and 15 with very short on pulses until the capacitances of the system 4, 5, and 2 are charged.

With a bidirectional topology, as for example the one shown in FIG. 3, to balance the voltage between the DC-link capacitors, it is also possible to alternatively work in buck (voltage divider) and boost (voltage doubler) modes of operation. In the case of a voltage divider, some charge is transferred from the top DC-link capacitor 5 to the bottom DC-link capacitor 4. Instead, in the case of a voltage doubler, some charge is transferred from the bottom DC-link capacitor 4 to the top DC-link capacitor 5. Therefore, if the top capacitor 5 voltage is too high, a buck mode of operation is useful to equalize the voltage between the two DC-link capacitances. Respectively, if the bottom capacitor 4 voltage is too high, a boost mode of operation is useful to equalize the voltage between the two DC-link capacitances.

Figure 5:
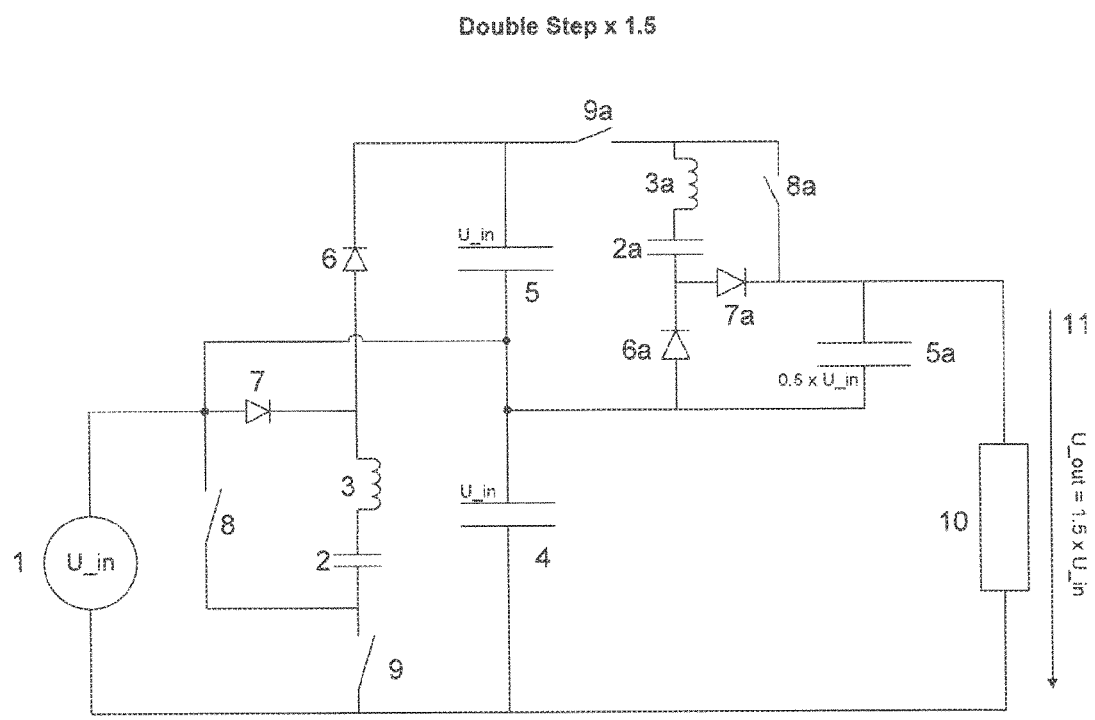
FIG. 5 shows a cascaded embodiment which generates a voltage multiplication by a factor of 1.5 using a two stage concept.

A two-step "cascading" charge pump embodiment is disclosed in FIG. 5. The voltage of the top DC-link capacitor 5 is halved, thus charging the output capacitor 5a with a half of the input Voltage U_in. In a completely analogous way, using two steps, it is possible to obtain the following U_out/U_in ratios: 0.25, 0.75, and 1.5.

Figure 6A:
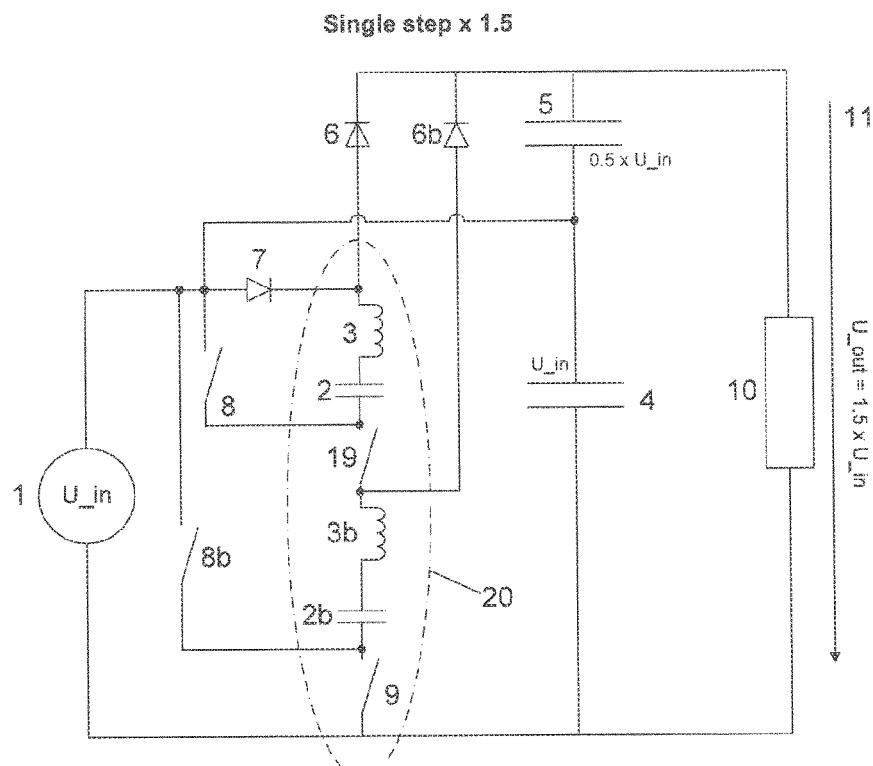
FIG. 6A shows a single step embodiment which generates a voltage multiplication by a factor of 1.5.
Figure 6B:
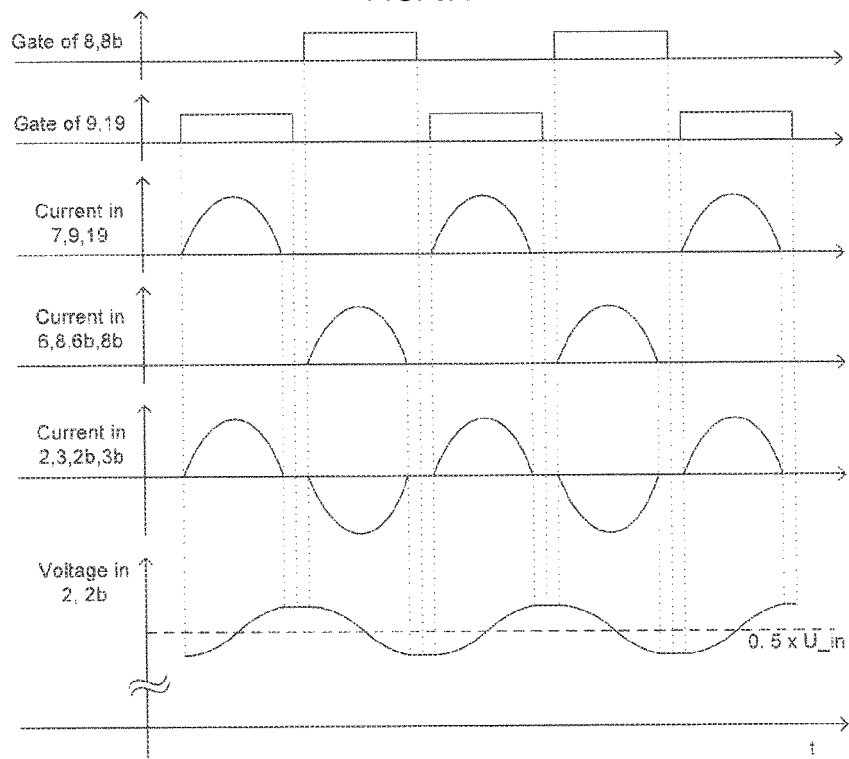
FIG. 6B shows the corresponding qualitative waveforms in the main components of FIG. 6A.

A fractional voltage ratio can also be obtained with a single step. An embodiment which boosts the voltage by a factor 1.5 is shown in FIG. 6A, and corresponding qualitative waveforms in the main components are shown in FIG. 6B. The charging process succeeds with two in series connected storage capacitances 2 and 2b, through the activation of the switches 9 and 19. The average voltage on the single storage capacitance is therefore only 0.5×U_in. With the activation of switches 8 and 8b, the discharge process succeeds with parallel-connected storage capacitors 2 and 2b. For this reason, the upper DC-link capacitor 5 is charged with 0.5×U_in and consequently the output voltage 11 is 1.5×U_in.

The serially connected circuit 20, which is in FIG. 6A is formed by two LC oscillating circuits 2, 2b, 3, and 3b, can also be composed of more than two of these elements in series. In this way, it is possible to obtain lower voltage ratios of 1.33 (if three elements are employed), 1.25 (4 elements), 1.2 (5 elements), and so on.

It is important to notice that the embodiment of FIG. 6A can also work as a voltage doubler (if the switch 19 is constantly on and the switch 8 is constantly off), de facto allowing a charge pump with selectable voltage ratio (in this specific case 2 or 1.5). Depending on the activated switches, one and the same circuit allows for a plurality of different voltage ratios.

Figure 7A:
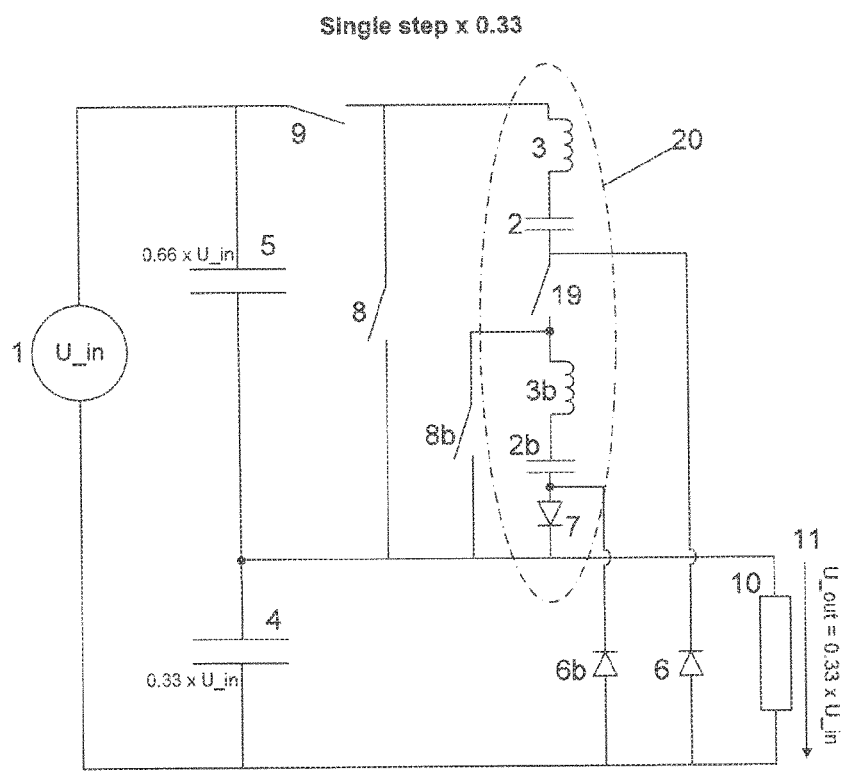
FIG. 7A shows a single step embodiment which generates a voltage multiplication by a factor of 1.5.
Figure 7B:
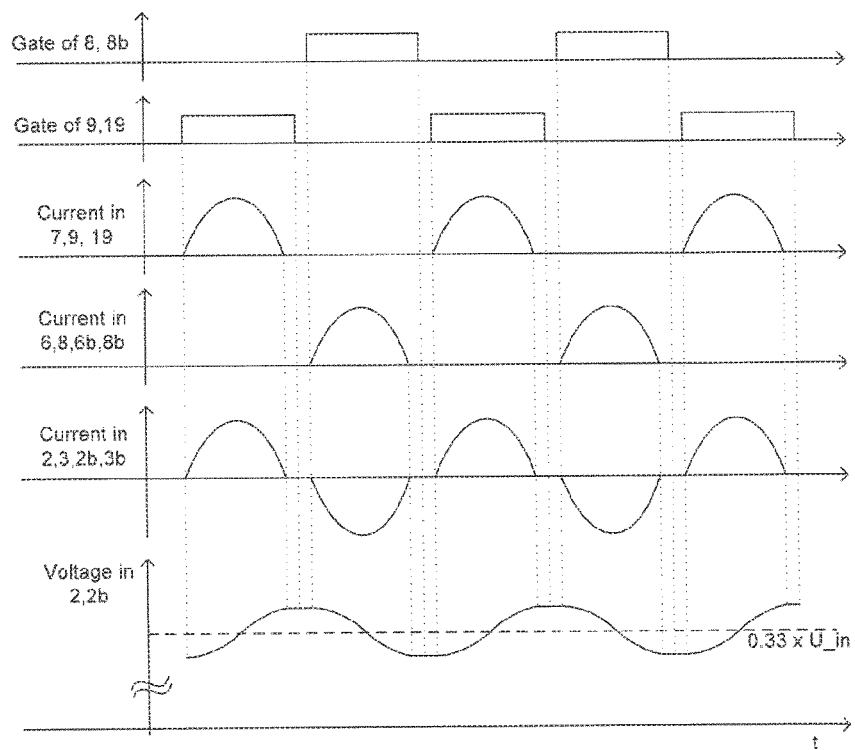
FIG. 7B shows the corresponding qualitative waveforms in the main components of FIG. 7A.

Another fractional voltage ratio can be obtained with the embodiment shown in FIG. 7A, with corresponding qualitative waveforms of the main components shown in FIG. 7B, which multiplies the voltage by a factor of 0.33. In addition, in this case, the charging process succeeds with two in-series connected storage capacitances (2 and 2b), through the activation of the switches 9 and 19. The average voltage on the single storage capacitance is therefore only 0.33×U_in. With the activation of switches 8 and 8b, the discharge process succeeds with parallel-connected storage capacitors 2 and 2b. For this reason, the bottom DC-link capacitor 5 is charged with 0.33×U_in.

The serially connected circuit 20, which is in FIG. 7A is composed of two LC oscillating circuits 2, 2b, 3, and 3b, can also be composed of more than two of these elements in series. In this way, it is possible to obtain lower voltage ratios of 0.25 (if three elements are employed), 0.2 (4 elements), 0.166 (5 elements), and so on.

Figure 8A:
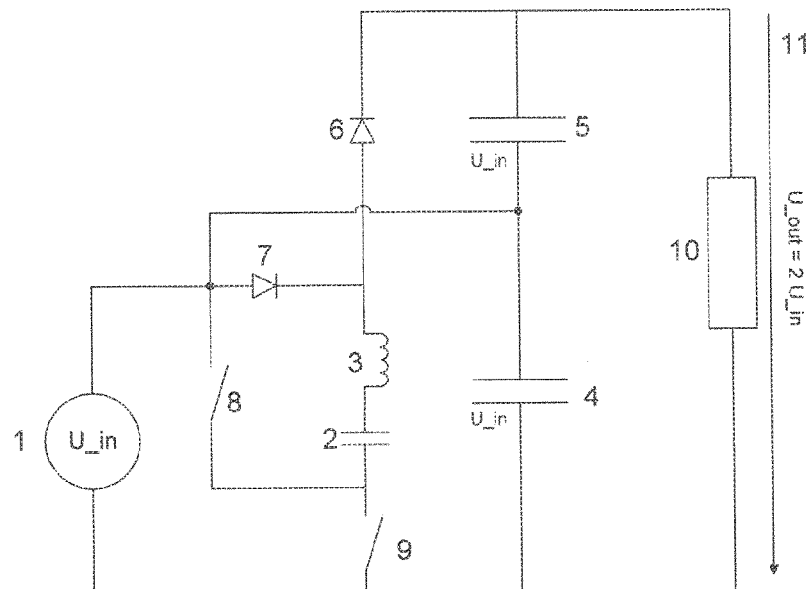
FIG. 8A shows a charge pump circuit operating at a reduced frequency to minimize switching and gate drive losses at low load.
Figure 8B:
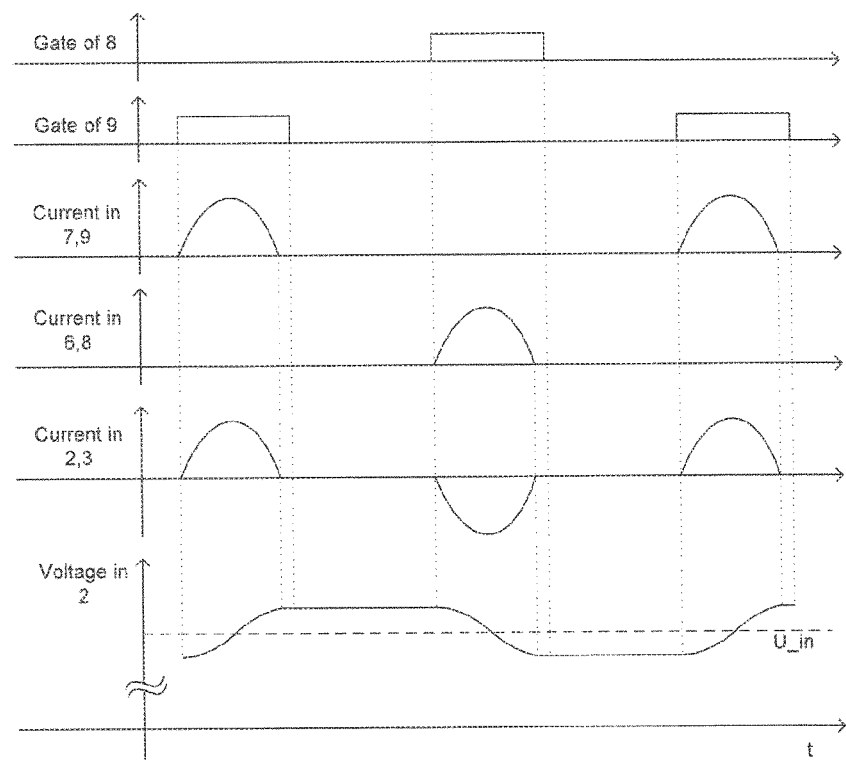
FIG. 8B shows the corresponding qualitative waveforms in the main components of FIG. 8A.

As shown in FIG. 8A, with corresponding qualitative waveforms of main components shown in FIG. 8B, the operation of the charge pump is also guaranteed for lower switching frequencies. If the charge pump works at very low load, gate drive and switching losses are dominant. For this reason, it is convenient to reduce the operating frequency. A reduction of the operation frequency can but must not necessarily involve a reduction of the duty cycle. On the other hand, high frequency switching is of advantage at the beginning of the operation of the DC-DC converter to pre-charge the capacitors 2, 4, and 5.

To obtain a lower voltage ripple on the DC-link capacitors, it is convenient to design circuits composed of two or more charge pumps (phases) which operate preferably at the same frequency. To minimize the voltage ripple, it is wiser to set the phase delay at 360°/n where n is the number of the operating phases.

The circuit in a preferred embodiment relies on the principle of balancing the top and bottom capacitors 4 and 5 and alternating buck and boost operation, and comprises two DC link capacitors 4 and 5, the sum voltage of both capacitors being the sum of both capacitor voltages. The top and the bottom capacitors 4 and 5 have about the same voltage. During the boost mode, the top capacitor 5 is lightly charged and the bottom capacitor 4 is lightly discharged, while in buck mode, the top capacitor 5 is lightly discharged and the bottom capacitor 4 is lightly charged. By alternating the two modes of operation, the equality of both capacitor voltages can be assured.

According to a further preferred embodiment, two or more DC capacitors can be switched on each other in the DC link.

LIST OF REFERENCE NUMERALS

1 Input DC-Link
2 Storage capacitor
2a Storage capacitor of a second step charge pump circuit
2b Storage capacitor in series
3 Inductive element
3a Inductive element of a second step charge pump circuit
3b Inductive element in series
4 DC-Link bottom capacitor
5 DC-Link top capacitor
6 Diode discharging the storage capacitor
6a Diode discharging the storage capacitor of a second step circuit
6b Diode discharging the storage capacitor connected in parallel
7 Diode charging the storage capacitor
7a Diode charging the storage capacitor of a second step circuit
7b Diode charging the storage capacitor connected in parallel
8 Switch discharging the storage capacitor
8a Switch discharging the storage capacitor of a second step circuit
8b Switch discharging the storage capacitor connected in parallel
9 Switch charging the storage capacitor
9a Switch charging the storage capacitor of a second step circuit
10 Load resistor
11 Output DC-Link, Voltage
12 Diode discharging the storage capacitor for an opposite energy flow
13 Diode charging the storage capacitor for an opposite energy flow
14 Switch discharging the storage capacitor for an opposite energy flow
15 Switch charging the storage capacitor for an opposite energy flow
16 Highly resistive switch for an active capacitor pre-charge
17 Resistor to pre-charge the storage capacitor
17a Resistor to pre-charge the storage capacitor (for voltage divider)
18 Resistors to balance the DC-Link capacitors
19 Additional switch allowing a series connection of storage capacitors
20 Storage capacitor bank connected in series

The invention claimed is:

1. A DC-DC converter, comprising an input DC-link, an output DC-link, the output DC-link connected to the input DC-link by a circuit arrangement comprising at least a storage capacitor, a DC-link capacitor, and at least one controllable switching arrangement, with the controllable switching arrangement adapted to connect at least one of the storage capacitor and DC-link capacitor and/or the input DC-link to the output DC-link, wherein an inductive element is serially connected immediately in front of the storage capacitor and both the storage capacitor and the inductive element are adapted to form a resonant circuit and wherein the circuit arrangement comprises a further DC-link capacitor serially connected to the DC-link capacitor, and permanently connected with the input DC-link and with the at least one controllable switching arrangement, the at least one controllable switching arrangement adapted to alternatively connect the further DC-link capacitor or the input DC-link to the storage capacitor, with a switching frequency of the at least one controllable switching arrangement and the resonance frequency of the resonant circuit being essentially equal.

2. The converter according to claim 1, wherein a first capacitor is the DC-link capacitor and is directly connected to the input DC-link, the input DC-link also connectable to the storage capacitor via the inductive element by a first controllable switching arrangement.

3. The converter according to claim 2, wherein a second capacitor is the further DC-link capacitor and is connected via a diode to either the input DC-link or, after activating a second controllable switching arrangement, to the inductive element and the storage capacitor.

4. The converter according to claim 2, wherein a second capacitor is the DC-link capacitor and is directly connected to the input DC-link, the input DC-link also connectable to the storage capacitor via the inductive element by the first controllable switching arrangement.

5. The converter according to claim 4, wherein the first capacitor is the further DC-link capacitor and is connected permanently to the output DC-link or, after activating a second controllable switching arrangement via a diode, to the storage capacitor and the inductive element.

6. The converter according to claim 1, wherein a first capacitor is the DC-link capacitor and is directly connected to the output DC-link, the output DC-link is also connectable to the storage capacitor via the inductive element a second controllable switching arrangement.

7. The converter according to claim 6, wherein a second capacitor is the further DC-link capacitor and is connected to the input DC-link or, after activating a first controllable switching arrangement, to the inductive element and the storage capacitor.

8. The converter according to claim 1, wherein first and second diodes are connected parallel to first and second switches of the at least one controllable switching arrangement, with a first diode parallel to a second switch being connected in reverse direction seen from the storage capacitor, and a second diode parallel to a first switch being connected in open direction seen from the storage capacitor.

9. The converter according to claim 8, wherein third and fourth switches are connected parallel to third and fourth diodes, with a third switch parallel to a fourth diode connecting a first DC-link that is one of the input DC-Link or the output DC-link, and a fourth switch parallel to a third diode connecting the inductive element to the DC-link capacitor and to a second DC-link that is another of the input DC-Link or output DC-link.

10. The converter according to claim 8, wherein parallel to each of the DC-link capacitor and the further DC-link capacitor a large resistor is connected, with large resistors being identical.

11. The converter according to claim 10, wherein a further at least one first resistor is connected between the storage capacitor and a closest large resistor and/or a further at least one second resistor is connected between the inductive element and a DC-link parallel to the DC-link capacitor and the further DC-link capacitor, the DC-link being one of the input DC-Link or the output DC-link.

12. The converter according to claim 9, wherein parallel to one or more switches of the first and second, and third and fourth switches there are connected highly resistive switches, and the converter is adapted to operate with the highly resistive switches during first switching events and changing to other switches of the first and second, and third and fourth switches thereafter.

13. The converter according to claim 1, wherein a further converter stage is connected between one capacitor of the DC-link capacitor or the further DC-link capacitor of a first converter stage, a storage capacitor of the further converter stage is connected to a DC-link capacitor of the further converter stage and the output DC-link, the output DC-link being connectable to the input DC-link and one of the DC-link capacitor or the further DC-link capacitor, as well as the storage capacitor of the further converter stage via an inductive element of the further converter stage by a first switch and/or a second switch of the further converter stage.

14. The converter according to claim 1, wherein a further storage capacitor and a further inductive element are connected in parallel to the storage capacitor and the inductive element, the further storage capacitor and the further inductive element capable of being activated by switches and connectable with one of the DC-link capacitor or the further DC-link capacitor being connected to the output DC-link.

15. The converter according to claim 6, wherein a further storage capacitor and a further inductive element are connected serially to the storage capacitor and inductive element via a switch, the further storage capacitor and the further inductive element capable of being activated by a further switch and connectable with one of the DC-link capacitor or the further DC-link capacitor.

* * * * *